3,344,048
ELECTROLYTIC PREPARATION OF VINYLLEAD COMPOUNDS
Paul Kobetz and Wilford H. Thomas, Baton Rouge, La., assignors to Ethyl Corporation, New York, N.Y., a corporation of Virginia
No Drawing. Filed Oct. 26, 1964, Ser. No. 406,559
11 Claims. (Cl. 204—59)

This application relates to a process for the production of lead compounds having vinylic groups attached to the lead.

The preparation of vinyllead compounds has been disclosed in U.S. Patent 3,071,607, patented Jan. 1, 1963. According to this patent the vinyllead compounds may be produced for example by reacting a vinyl Grignard reagent with the appropriate lead salt. However, such a process has certain disadvantages such as the relatively low yields obtained. Further, the free lead produced by such a reaction will not react with additional quantities of vinylic Grignard reagent and thus it must be recovered. It is an object of this invention to provide an improved process for the preparation of lead compounds having at least one vinylic group attached to the lead. It is a further object of this invention to provide a process for the production of lead compounds having both vinylic and alkyl radicals attached to the lead. It is an additional object of this invention to directly produce an organolead composition suitable for improved antiknock compositions. Another object is to produce organolead compounds having vinylic groups attached to the lead at higher yields and efficiencies. These and other objects will be apparent in the description which follows.

According to this invention lead compounds having at least one vinylic group attached to the lead may be produced at high yields and current efficiencies by electrolyzing in an electrolytic cell having a lead anode, a liquid composition comprising a complex of a vinylic magnesium compound with a triorgano compound of the formula $R_3Me$ wherein R is a monovalent organo radical and Me is an element selected from the group consisting of aluminum and boron. The lead anode of the electrolytic cell supplies the lead of the organolead product. The cathode may be either lead or another suitable material such as stainnless steel.

One of the unexpected advantages of this invention is that a desired distribution of tetraorganolead compounds comprising tetraalkyllead, tetravinyliclead and alkylvinyliclead compounds such as trialkylvinyliclead, dialkyldivinylclead, and alkyltrivinyliclead may be achieved. Distributions comprising all of the molecular species from tetraalkyllead to tetravinyliclead may be produced. Another advantage is that certain valuable species may be produced in high quantities. Such compositions have been found to be of particular advantage as an antiknock composition in gasoline. Furthermore, by producing these mixed compositions directly, the process of redistributing the organo radicals in a mixture of tetraalkyllead and tetravinyliclead compounds may be avoided. A further advantage of this invention is that the vinyliclead compounds are produced in high yields in an efficient process. It has been found that the lead compounds may be produced at high current efficiencies. Thus considerable saving in current expenditures is realized and a greater throughput per unit time is achieved.

It is one of the features of this invention that the liquid composition comprising the complex of a vinylic magnesium compound with a compound of the formula $R_3Me$ has a high conductivity. It is possible to contact the reaction in the absence of added electrolytes. By conducting the reaction in the absence of additional electrolytes or solvents the recovery of the organo-lead product as well as the by-products is facilitated.

Another embodiment of this invention is the addition of compound of the formula $R_nX$ to the electrolyte comprising the complex of the vinylic magnesium compound and the compound of the formula $R_3Me$. In the formula $R_nX$, R is a hydrocarbon radical, X is an anion of an inorganic acid and n is the valence of the anion. The $R_nX$ compound may be such as an aliphatic halide e.g. an alkyl halide, an alkenyl halide or an alkynyl halide. During the electrolysis the hydrocarbon radicals of the $R_nX$ compound may become attached to the lead from the anode and contribute to the formation of lead compounds. The $R_nX$ compound may also increase the conductivity of the electrolyte.

Other additives, which may be incorporated into the electrolyte at any time, are dialkyl magnesium compounds wherein the alkyl group has from 1 to 4 carbon atoms, such as dimethyl magnesium. It is one of the features of this invention that the ratio of alkyl and vinylic groups obtained in the final lead product may be controlled by adding either dialkyl magnesium or divinylic magnesium compounds initially, during operation or after an initial period of operation. A further feature of this invention is in the addition of a compound of the said formula $R_3Me$ either during the electrolysis or after a period of electrolysis. Similarly, the ratio of vinylic groups and hydrocarbon groups may be controlled by the ratio of $R_3Me$ compound in the complex.

The process of this invention may be more completely understood and illustrated by the following examples. All parts are by weight unless expressed otherwise.

*Example I*

A complex of divinyl magnesium and trimethylaluminum was used as the complex to be electrolyzed. The divinyl magnesium was prepared by reacting a tetrahydrofuran (THF) solution of vinyl magnesium chloride with dimethyl ether of diethylene glycol (DMC). The complex was formed as follows: First vinyl magnesium chloride was prepared by the reaction of magnesium and vinyl chloride. Magnesium chips, 121.6 g., were reacted in 1.075 g. of tetrahydrofuran (THF) with 396 g. ot vinyl chloride. The reaction product was cooled and unreacted vinyl chloride was vented. The product solution, 1300 ml., was decanted and 500 ml. of tetrahydrofuran was added to extract the residue. Most of the residue went into solution, which was then decanted and added to the product solution making a total of 1900 ml. Aliquots of this product solution indicated it was 2.64 molar with respect to magnesium and 2.74 molar with respect to chloride ions. The product was vinyl magnesium chloride dissolved in tetrahydrofuran.

A 125 ml. portion of the vinyl magnesium chloride product solution (equivalent to about 335 millimols of vinyl magnesium chloride) and 200 ml. of dimethyl ether of diethylene glycol were added to a 500 ml. round bottom flask with a magnetic stirrer. The flask contents were heated to 50° C. and stirred slowly for 20 minutes to cause the magnesium chloride crystals to grow to facilitate their removal by filtration. The solids were removed by a vacuum filtration in a dry box using a fine fritted glass filter and washer with two 15 ml. portions of DMC. The THF and some DMC were removed from the filtrate by warming the flask with a heating mantle while pulling a strong vacuum on the flask. Aliquots of the filtrate were analyzed for magnesium and chloride. An aliquot was hydrolyzed, evolved gases were collected and analyzed by mass spectrographic methods. A sample of the vinyl magnesium chloride in THF was also hydrolyzed and evolved gases analyzed for a comparison. The solids on the fritted glass filter were dissolved in a small quantity of dilute sulfuric acid and analyzed for magnesium and chloride ions. The magneisum and chloride analysis revealed that 85 to 90 mol percent of the vinyl magnesium chloride was converted to divinyl magnesium.

The complex of divinyl magnesium and trimethylaluminum was formed by mixing a quantity of the divinyl magnesium solution formed above in an amount equivalent to 0.39 mole of divinyl magnesium with 5 ml. of trimethylaluminum.

The electrolytic cell used in these tests has a 29 mm. by 200 mm. Pyrex test tube fitted with a stopper having a ⅜-inch glass T for charging the electrolyte or for connection to a gas burette fitted with mercury for collecting and measuring gases evolved. When gas was not being collected the side arm of the glass T was connected to a nitrogen blubber for maintaining an inert atmosphere in the cell. A hypodermic needle through the stopper was connected to a small cylinder for supplying any hydrocarbon halide, such as vinyl chloride, to the electrolytic solution. Two copper wires for the electrical leads were fitted tightly through holes in the stopper. The cathode was a stainless steel rectangular sheet which was about 2 cm. wide, 10 cm. long and about ¹⁄₁₆-inch thick. The cathode was sandwiched between two lead anode sheets of approximately the same size as the cathode. Teflon spacers held the electrodes about 0.5 cm. apart. Electrical direct current (DC) was supplied for the test by a battery charger operating off regular 115 volt AC supply lines and voltage control was obtained by a rheostat on the battery charger. The current was measured by an ammeter and by a copper coulometer. The electrolysis was conducted at an ambient temperature of room temperature.

Electrolysis was conducted by applying a potential of five volts across the electrodes. During the run vinyl chloride was bubbled through the electrolyte. Current flow was 200 milliamps (0.005 amp/sq. cm.) and was allowed to continue overnight. Following electrolysis, the amount of tetraorgano lead compounds produced was determined by analyzing a small aliquot of the electrolyte solution by the dithizone method of analysis. The products were determined from a VPC chromatogram made from a solution remaining after adding 10 ml. benzene and extracting the electrolyte with a saturated solution of ammonium chloride to remove magnesium compounds, with a sodium hydroxide solution to remove aluminum compounds, and with water to remove the dimethyl ethers of diethylene glycol. The results revealed that 1.83 parts of lead were present as tetraorgano lead compounds and the VPC chromatogram revealed that the tetraorgano lead compounds produced included trimethylvinyllead, dimethyldivinyllead, methyltrivinyllead, and tetramethyllead in a desired distribution of the compounds as an antiknock composition.

Example II

When Example I was repeated with the exception that the divinyl magnesium was not complexed with trimethylaluminum, the conductivity was considerably lower. In less than two hours the current had dropped to less than 80 milliamps (0.002 ampere per sq. cm.).

Employing the same electrolytic cell of Example I and the same general procedure for electrolysis and the formation of the complex, a series of runs, Examples III through X, is conducted as set forth in the table.

Example XI

Example I is repeated with the exception that vinyl chloride is not added to the electrolyte and with the further exception that dimethyl magnesium is added during the run in an amount equivalent to maintain the ratio of methyl groups to vinyl groups in the product at a fairly constant ratio throughout the run. Once the reaction is stabilized the product contains $(CH_3)_4Pb$, $(CH_3)_3(C_2H_3)Pb$, $(CH_3)_2(C_2H_3)_2Pb$, $CH_3(C_2H_3)_3Pb$ and $(C_2H_3)_4Pb$

TABLE

| Ex. No. | Vi₂Mg | R₃Me | RX | Solvent | Temp. Reaction (°C.) | Hrs. Oper. | Product |
|---|---|---|---|---|---|---|---|
| III | 1.0M*(C₂H₃)₂Mg | 1.0M Trimethylaluminum. | None | DMC | 50 | 14 | (CH₃)₄Pb, (CH₃)₃C₂H₃Pb, (CH₃)₂(C₂H₃)₂Pb, CH₃(C₂H₃)₃Pb, (C₂H₃)₄Pb |
| IV | 1.0M(C₂H₃)₂Mg | 0.9M Triethylaluminum. | do | DMC | 75 | 7 | (C₂H₅)₄Pb, (C₂H₅)₃C₂H₃Pb, (C₂H₅)₂(C₂H₃)₂Pb, C₂H₅(C₂H₃)₃Pb, (C₂H₃)₄Pb |
| V | 1.0M (C₂H₃)₂Mg | 1.0M Trimethylboron. | do | DMC | 75 | 14 | (CH₃)₄Pb, (CH₃)₃C₂H₃Pb, (CH₃)₂(C₂H₃)₂Pb, CH₃(C₂H₃)₃Pb, (C₂H₃)₄Pb |
| VI | 1.0M(C₂H₃)₂Mg | 1.0M Methoxydimethylaluminum. | do | 50% DMC, 50% THF. | 65 | 15 | (CH₃)₄Pb, (CH₃)₃C₂H₃Pb, (CH₃)₂(C₂H₃)₂Pb, CH₃(C₂H₃)₃Pb, (C₂H₃)₄Pb |
| VII | 1.0M(C₂H₃)₂Mg | 1.1M Divinylmethylaluminum. | 0.5M CH₃Cl | 50% DMC, 50% THF. | 65 | 15 | (CH₃)₄Pb, (CH₃)₃C₂H₃Pb, (CH₃)₂(C₂H₃)₂Pb, CH₃(C₂H₃)₃Pb, (C₂H₃)₄Pb |
| VIII | 1.0M(CH₃—CH=CH)₂Mg | 2.0M Trimethylaluminum. | 1.0M CH₃Cl | DMC | 50 | 15 | (CH₃)₄Pb, (CH₃)₃(CH₃—CH=CH)Pb, (CH₃)₂(CH₃—CH=CH)₂Pb, CH₃(CH₃—CH=CH)₃Pb, (CH₃—CH=CH)₄Pb |
| IX | 1.0M(C₂H₃)₂Mg | 1.5M Triphenylaluminum. | None | DMC | 50 | 15 | (C₆H₅)₄Pb, (C₆H₅)₃(C₂H₃)Pb, (C₆H₅)₂(C₂H₃)₂Pb, (C₆H₅)(C₂H₃)₃Pb, (C₂H₃)₄Pb |
| X | 1.0M(C₂H₃)Mg | 0.5M Triphenoxyaluminum. | 0.25M CH₃Cl | 50% DMC, 50% THF. | 65 | 15 | (CH₃)₄Pb, (CH₃)₃(C₂H₃)Pb, (CH₃)₂(C₂H₃)₂Pb, (CH₃)(C₂H₃)₃Pb, (C₂H₃)₄Pb |

*M refers to mole.

Example XII

Example XI is repeated with the exception that divinyl magnesium is fed to the run instead of dimethyl magnesium.

Example XIII

Example III is repeated with the exception that trimethylaluminum in an amount of 0.5 mole total is added to the electrolyte during the 14 hours of operation.

The vinylic magnesium compounds employed in the formation of the complexes of the present invention are subject to some latitude. At least one vinylic radical is attached to the magnesium. The vinylic radicals are radicals of 2–8 carbon atoms, preferably 1-alkenyl radicals, with the preferred radicals having from 2–4 carbon atoms. The vinylic radicals may be, for example, ethenyl, 1-propenyl, isopropenyl, 1-butenyl, 2-methylpropenyl, 2-ethyl-1-hexenyl, mixtures thereof and the like. The second radical attached to the magnesium will be aliphatic and may also be a vinylic radical or it may be an alkyl radical. The alkyl radicals will have from 1–8 carbon atoms with the preferred range being from 1–4 carbon atoms. Preferably, the vinylic magnesium compounds will be divinylic magnesium compounds. Examples of vinylic magnesium compounds are divinyl magnesium, methylvinyl magnesium, ethylvinyl magnesium, di-1-propenyl magnesium, vinylpropenyl magnesium, diisopropenyl magnesium, di-1-butenyl magnesium, di-2-methyl-1-butenyl magnesium, di-1-octenyl magnesium, mixtures thereof and the like. Unsubstituted vinylic magnesium compounds are preferred. A particularly preferred vinylic magnesium compound is divinyl magnesium.

The vinylic magnesium compounds may be prepared in a number of ways. One method is illustrated in Example I above. That is, a solution of a vinylic Grignard reagent in tetrahydrofuran is combined with the dimethyl ether of ethylene glycol whereby magnesium halide precipitates out of solution leaving the vinylic magnesium compound in solution. Another method of preparation is disclosed in U.S. 2,999,889, issued Sept. 12, 1961, which disclosure is herein incorporated by reference. According to this patent divinyl magnesium is produced by the reaction of divinylmercury with magnesium.

The triorgano aluminum or boron compounds employed in forming the electrolyte complexes of the present invention are also subject to some latitude. Radicals attached to the aluminum radicals include alkyl radicals such as methyl, ethyl and isopropyl; alkenyl radicals such as vinyl and 1-propenyl; alkynyl radicals such as ethynyl; alkoxy such as butoxy; aryl such as phenyl, phenoxy, benzyl or tolyl and the like. The compounds will suitably have at least one carbon to aluminum bond. Preferred are the trialkyl compounds or the combinations of alkyl and alkoxy radicals. The radicals will have from 1 to 8 carbon atoms with these having from 1 to 2 giving superior results. By way of illustration of the triorgano aluminum or boron compounds employable, the following are typical examples: trimethylboron, triethylboron, triisobutylboron, trivinylboron, trivinylaluminum, trihexylaluminum, trioctylboron, tri-3-hexenylaluminum, methyldiethylboron, trimethoxyaluminum, methyldiphenylaluminum, ethyldimethylboron, mixtures thereof and the like. Trimethylaluminum and triethylaluminum comprise an especially preferred embodiment.

The electrolyte complexes of the present invention are obtained preferably by mixing in the liquid state the vinylic magnesium compounds, such as those typified above, in essentially anhydrous condition with the triorgano aluminum compound, preferably with heating in the presence of an inert atmosphere such as nitrogen. The ratio of the vinylic magnesium compound to the triorgano aluminum compound can be varied such as from 0.1 to 50 moles of vinylic magnesium compound per mole of triorgano aluminum compound. Best results are obtained when the ratio of vinylic magnesium compound to triorgano aluminum compound is between about 0.5 to 5 moles per mole of triorgano aluminum compound. Complex formation wherein essentially one mole of the vinylic magnesium compound and one mole of the triorgano aluminum compound are employed is preferred. However, an excess of either ingredient over the amount needed for complex formation may be utilized. Any excess may remain in the electrolyte solution and be electrolyzed to form tetraorganolead compounds. During preparation of the complex, at least one of the compounds should be in the liquid state, and this may be accomplished, if necessary, by heating one or both of the reactants. Alternatively or additionally, a suitable inert organic solvent, such as the hydrocarbons or ethers, can be employed to solubilize one of the ingredients, especially the triorgano aluminum compound and then heating, as required, to accelerate formation of the complex.

As a nonessential but preferred embodiment of this invention, the above mentioned compounds of the formula $R_nX$ may be introduced into the electrolyte. By such a procedure the lead compound product of the electrolysis may be modified because some of the hydrocarbon radicals from the compound $R_nX$ will become substituted in the lead compound product. R of the formula $R_nX$ is preferably alkyl, alkenyl or aryl such as phenyl and X is a negative atom or radical capable of reacting with magnesium under the conditions of reaction to form the corresponding salts $MgX_2$. For the most part, these compounds $R_nX$ are compounds of inorganic acid anions such as the alkyl, alkenyl, alkynyl and aryl chlorides, bromides, iodides and phosphates. In general, the $R_nX$ compounds are the monochloro, monobromo, and monoiodo derivatives of the aliphatic and aromatic hydrocarbons such as methane, ethane, ethylene, propane, butane, isobutane, pentane, benzene, and the corresponding trialkylphosphates. Aliphatic radicals are preferred. The hydrocarbon radical R will generally have from 1 to 8 carbon atoms, with from 1 to 3 carbon atoms being particularly preferred. Examples of these compounds are methyl chloride, methyl iodide, ethyl chloride, ethyl bromide, ethyl iodide, vinyl chloride, vinyl bromide, vinyl iodide, n-propyl chloride, 2-chloro-1-propene, n-butyl chloride, 3-butynyl chloride, isobutyl chloride, n-butyl bromide, n-amyl chloride, n-amyl iodide, phenyl bromide, and triethylphosphate can be successfully employed. Various combinations of these $R_nX$ compounds can also be used. For example, two or more $R_nX$ compounds can be used simultaneously in a one or two-stage process, or different $R_nX$ compounds can be used in each stage of a two-stage process. For instance, one method of producing mixed or unsymmetrical lead compounds wherein the alkyl groups are different is to utilize a combination of $R_nX$ compounds, such as a combination of methyl chloride and ethyl chloride. The methyl chloride and ethyl chloride may then be combined with a complex of the vinylic magnesium compound and the triorgano aluminum compound to form the electrolyte.

If employed, the ratio of the $R_nX$ compound to the described complex present in the electrolyte may be varied somewhat but generally will be in the ratio of 0.1 to 10 moles of $R_nX$ compound per mole of the complex. The preferred ratio of $R_nX$ compound to the complex is between 0.25 and 2.5 moles of $R_nX$ compound per mole of the complex.

The electrolytic process may be operated as a batch process or may be operated continuously. All of the complex and, if utilized, all of the $R_nX$ compound may be added initially or either of these may be added continuously or intermittently throughout the reaction. Similarly, any solvent or diluent may be introduced entirely initially or may be added later. Of course, in a continuous operation the electrolyzed composition may be continuously or intermittently removed from the cell. Similarly, additional or new lead anodes may be added as required.

The vinylic lead compositions produced according to the present process comprise organolead compounds having between 1 to 4 vinylic groups attached directly to lead with the remaining valences of the lead being satisfied by hydrocarbon radicals, preferably alkyl radicals. Generally, the alkyl radicals will contain from 1 to 8 carbon atoms, with the alkyl radicals having one or two carbon atoms being particularly preferred. The hydrocarbon or vinylic groups may be the same or different. That is, the same or different hydrocarbon radicals may be attached to the lead and the same or different vinylic radicals may be attached to the lead. The products must contain at least one vinylic radical. The preferred vinylic radicals are the 1-alkenyl radicals. Examples of compounds that may be produced according to this invention are trimethylvinyllead, dimethyldivinyllead, methyltrivinyllead, triethylvinyllead, diethyldivinyllead, ethyltrivinyllead, trivinyllead, methylethyldivinyllead, methyldiethylvinyllead, di-n-butyldivinyllead, n-hexyltrivinyllead, 2-ethylhexyltrivinyllead, dimethylethylvinylled, dimethyldipropenyllead, dimethyldibutenyllead, methyltriisobutenyllead, isopropyltrivinyllead, methyldivinylpropenyllead, mixtures thereof and the like. Other combinations will be evident from a consideration of the trihydrocarbon aluminum or boron compounds and the vinylic magnesium compounds discussed above.

Particularly preferred compositions produced are those containing the mixed organolead compositions such as one containing tetraalkyllead, trialkylvinyllead, dialkyldivinyllead, alkyltrivinyllead, and tetravinyllead, wherein the alkyl groups contain from one to three carbon atoms. Especially preferred compositions containing tetravinyllead, tetramethyllead and the lead compounds having all of the combinations of these radicals. Such compositions may be produced directly by the process of this invention. These compositions possess unique characteristics such as for antiknock compositions, and it is an important feature of this invention that these compositions may be produced directly without the necessity of redistributing a combination of tetravinyllead and tetraalkyllead. A predominately hydrocarbon vinyliclead composition may be produced by the process of this invention.

The cell employed may be of conventional design with one or more electrodes and cathodes. Provision should be made for the release of any gases evolved during the reaction. Also the cell should be suitable for operating under the pressure generated by the particular reactants at the temperature of reaction. Suitably the electrolytic solution will be anhydrous.

The temperature during electrolysis is not critical. It should be sufficiently high to give reasonable reaction rates but should not be above the decomposition temperature of the organometallic reactants or the organolead products. Thus, the operating temperature of the reaction depends upon the particular organometallic compounds involved. In general, suitable temperatures are between about −30° C. and about 130° C., but temperatures from about 15 to 100° C. are preferred to facilitate heat removal, for maximum current efficiency and for best results. Higher temperatures can be employed when using organolead thermal stabilizers. In some instances considerable exothermic heat is generated and consequently a cooling medium may be desired to control the temperature.

About atmospheric pressure is normally employed, although subatmospheric pressures are permissible. In some instances, supraatmospheric pressure is preferred, particularly when employing a relatively high temperature and a relatively volatile solvent or electrolyte. Also, a pressure of inert gas is sometimes desirable, for example, to assure anhydrous conditions. The pressure will generally be from about 0 to 500 p.s.i. with the range of about atmospheric (STP) to 250 p.s.i.g. being particularly suitable.

In some instances various solvents can be employed during the electrolysis step. The solvent should desirably dissolve the vinylicmagnesium compound and the $R_nX$ compound, if any, and preferably will be inert to reaction with the organolead product. The use of a solvent, however, is not essential to the operation of the process and its absence may be desirable in some instances. Thus when electrolyzing the electrolyte in the absence of a solvent, the organolead compound is generally insoluble and separates as a distinct phase which can easily be recovered. When a solvent is employed, it is not necessary that the organolead product be soluble in the solvent. When the organolead product is insoluble in the solvent system, it can be recovered directly from the cell as a separate phase. In this case it is generally desirable to withdraw a part of the solvent-containing electrolyte, either continuously or periodically, to use as a solvent for the fresh electrolyte feed. In general, solvents suitable are the ethers and polyethers (including cyclic ethers), tertiary amines, other organometallics, amides, and substituted amides, and hydrocarbons, particularly the aromatic hydrocarbons. Typical examples of suitable solvents are illustrated in the above examples. Similar results are obtained when these examples are repeated with triisopropyl amine, toluene, xylene, and the like. Additional typical examples of suitable dialkylamides such as diethylamide and ethers, such as dimethyl ether, methylethyl ether, methyl-n-propyl ether, and mixtures of these. Suitable polyethers are ethylene glycol diethers, such as methylethyl diethyl, ethylbutyl, and dibutyl; diethylene glycol ethers, such as dimethyl, diethyl, ethylbutyl and butyl lauryl; trimethylene glycol ethers, such as dimethyl, methylethyl; glycerol ethers, such as trimethyl, diethyl methyl, etc.; and cyclic ethers of 2 to 5 carbon atoms, such as 1,4-dioxane, 1,3-dioxane, dioxolane and tetrahydrofuran. Typical amines suitable for this invention include aliphatic and aromatic amines and heterocyclic nitrogen compounds. The preferred tertiary amines for use in this invention are trimethyl amine, dimethyl ethyl amine, tetramethyl ethylene diamine and n-methyl morpholine. The selection and the amount of solvent or diluent to be utilized can be determined by one skilled in the art by considering such factors as the degree of fluidity desired, the conductivity requirements and so forth.

The lead anode can be pure lead or alloys thereof of varying shapes. Typical examples of alloy metals are bismuth, cadmium, antimony, sodium, lithium and copper. Likewise the lead or lead alloys can be coated or impregnated on a conductive metal, either metallic or non-metallic, such as graphite. The anode may be replenished by the addition of lead shot or lead sheet. The cathode can be any suitable conductive metal but is preferably one which does not alloy with the metal produced. Examples of cathodes are stainless steel and copper.

The voltage and amperage necessary for the reaction depend upon the conductivity of the electrolyte, as well as upon the specific resistance of the cell. In general, the potential across the electrodes should be between about 0.5 and 50 volts, although not greater than 20 volts is normally required or desirable. Preferably, a potential of 1–15 volts is employed. In general, not greater than 0.25 ampere/sq. cm. is employed. A preferred range is between 0.002 to 0.1 ampere/sq. cm.

The products of this invention possess considerable utility. These compositions are soluble in hydrocarbons and are valuable as antiknock compositions for gasolines. The compositions containing the distributed species are of particular value. As has been shown this composition may be produced directly by the process of this invention. The products may also be used as monomers in the production of polymers, e.g. for the production of copolymers with other vinyl compounds.

Other embodiments of this invention can be made without departing from the spirit and scope of this invention which is not limited to the specific embodiments given herein.

What is claimed is:

1. A process for the production of lead compounds having vinylic groups attached to the lead which comprises electrolyzing in an electrolytic cell having a lead anode a composition comprising a complex of a divinylic magnesium compound with a triorgano compound represented by the formula $R_3Me$ wherein R is a monovalent organo radical and Me is an element selected from the group consisting of aluminum and boron.

2. A process for the production of alkylvinyliclead compounds which comprises electrolyzing in an electrolytic cell having a lead anode a liquid composition comprising a complex of a di-1-alkenyl magnesium compound with a compound of the formula $R_3Me$ wherein R is a radical selected from the group consisting of lower alkyl, lower alkoxide or mixtures thereof and Me is an element selected from the group consisting of aluminum and boron.

3. A process for the production of methylvinyllead compounds which comprises electrolyzing in an electrolytic cell having a lead anode a liquid composition comprising a complex of divinyl magnesium with a compound of the formula $R_3Me$ wherein R is a radical selected from the group consisting of methyl radicals, lower methoxide radicals or mixtures thereof and Me is an element selected from the group consisting of aluminum and boron.

4. A process for the production of methylvinyllead compounds which comprises electrolyzing in an electrolytic cell having a lead anode a liquid composition comprising a complex of divinyl magnesium with a compound of the formula $R_3Me$ wherein R is a radical selected from the group consisting of ethyl radicals, lower ethoxide radicals or mixtures thereof and Me is an element selected from the group consisting of aluminum and boron.

5. A process for the production of a mixture of lead compounds comprising tetravinyllead, methyltrivinyllead, dimethyldivinyllead, trimethylvinyllead and tetramethyllead which comprises electrolyzing in an electrolytic cell having a lead anode a liquid composition comprising a complex of divinyl magnesium with trimethylaluminum.

6. A process for the production of a mixture of lead compounds comprising tetravinyllead, ethyltrivinyllead, diethyldivinyllead, triethylvinyllead and tetraethyllead which comprises electrolyzing in an electrolytic cell having a lead anode a liquid composition comprising a complex of divinyl magnesium with triethylaluminum.

7. A process according to claim 5 wherein the said liquid composition contains an aliphatic ether.

8. A process according to claim 5 wherein said liquid composition contains a cyclic ether.

9. A process according to claim 5 wherein dimethyl magnesium is added to the said complex.

10. A process according to claim 5 wherein said liquid composition contains tetrahydrofuran and the dimethyl ether of diethylene glycol.

11. A process according to claim 5 wherein vinyl chloride is added to the liquid composition being electrolyzed.

References Cited

UNITED STATES PATENTS

| 2,999,889 | 9/1961 | Foster et al. | 260—665 |
| 3,177,130 | 4/1965 | Giraitis | 204—59 |
| 3,197,392 | 7/1965 | Silversmith et al. | 204—59 |
| 3,312,605 | 4/1967 | Braithwaite | 204—59 |

HOWARD S. WILLIAMS, *Primary Examiner.*